(12) United States Patent
Olenick et al.

(10) Patent No.: US 7,761,586 B2
(45) Date of Patent: Jul. 20, 2010

(54) ACCESSING AND MANIPULATING DATA IN A DATA FLOW GRAPH

(75) Inventors: Brad M. Olenick, Redmond, WA (US); Clemens A. Szyperski, Redmond, WA (US); David George Hunt, Woodinville, WA (US); Gregory Lawrence Hughes, Bellevue, WA (US); William A. Manis, Sammamish, WA (US); Terry Zmrhal, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1001 days.

(21) Appl. No.: 11/348,388

(22) Filed: Feb. 6, 2006

(65) Prior Publication Data

US 2007/0198457 A1     Aug. 23, 2007

(51) Int. Cl.
  G06F 15/16    (2006.01)
  G06F 7/00     (2006.01)
  G06F 17/30    (2006.01)
(52) U.S. Cl. ........................ 709/230; 709/246; 707/705; 707/736; 707/756; 707/797; 707/966
(58) Field of Classification Search ................. 709/230, 709/245; 707/705, 736, 756, 797
See application file for complete search history.

(56) References Cited

U.S. PATENT DOCUMENTS

| | | | |
|---|---|---|---|
| 6,226,649 B1 * | 5/2001 | Bodamer et al. | 707/104.1 |
| 6,327,594 B1 | 12/2001 | Van Huben et al. | |
| 6,377,953 B1 * | 4/2002 | Gawlick et al. | 707/102 |
| 6,578,046 B2 | 6/2003 | Chang et al. | |
| 6,654,747 B1 | 11/2003 | Van Huben et al. | |
| 6,694,310 B1 * | 2/2004 | Yu et al. | 707/4 |
| 6,704,914 B2 * | 3/2004 | Nishida et al. | 716/8 |
| 6,748,388 B1 | 6/2004 | Kasamsetty et al. | |
| 6,760,721 B1 * | 7/2004 | Chasen et al. | 707/3 |
| 7,158,990 B1 * | 1/2007 | Guo et al. | 707/102 |
| 2001/0021913 A1 * | 9/2001 | Leymann et al. | 705/7 |
| 2002/0019671 A1 * | 2/2002 | Lee et al. | 700/4 |

(Continued)

OTHER PUBLICATIONS

Rob Caron and Paul Larsen "Data Interoperability Using Enterprise-Wide Data Sources", pp. 1-12 Aug. 1999 http://msdn.microsoft.com/library/default.asp?url=/library/en-us/dnuda/html/dataint.asp.

(Continued)

Primary Examiner—Rupal D Dharia
Assistant Examiner—Joe Chacko
(74) Attorney, Agent, or Firm—Workman Nydegger (57) ABSTRACT

The present invention extends to methods, systems, and computer program products for accessing and manipulating data in a data flow graph. A data flow graph includes one more transforms for transforming data from one or more data stores into different formats accessible to clients. Transforms can be configured to join and split data from the same or different data stores. A metadata tree logically represents the data flow graph including locations that provide output from transforms of the data flow graph. The locations can be referenced by clients to access transformed outputs. Clients can register dependencies on data at various locations and can request evaluation of the data in response to data changes at a corresponding data store. Clients can also request data changes be propagated back through the data flow graph to one or more data stores and implemented at the one or more data stores.

21 Claims, 6 Drawing Sheets

U.S. PATENT DOCUMENTS

| | | | |
|---|---|---|---|
| 2002/0037003 A1* | 3/2002 | Windecker | 370/352 |
| 2003/0220820 A1 | 11/2003 | Sears et al. | |
| 2005/0021542 A1 | 1/2005 | Irle et al. | |
| 2005/0148829 A1 | 7/2005 | Abraham-Fuchs et al. | |
| 2005/0160110 A1* | 7/2005 | Charlet et al. | 707/102 |
| 2005/0267901 A1* | 12/2005 | Irlen | 707/100 |

OTHER PUBLICATIONS

ClearPath Servers "Network Database OLE DB Data Provider for ClearPath OS 2200", pp. 1-3 http://www.unisys.com/products/clearpath_servers/internet_and_application_integration/open_data_access/network_database_ole_db_data_provider_for_clearpath_os_2200.htm.

* cited by examiner

ACCESSING AND MANIPULATING DATA IN A DATA FLOW GRAPH

CROSS-REFERENCE TO RELATED APPLICATIONS

Not Applicable

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the communication (e.g., the exchange of electronic messages) between a number of computer systems and/or other electronic devices via wired and/or wireless computer networks.

It is common for many computerized tasks to utilize data from multiple different sources. Unfortunately, data from different sources presents itself according to widely varying data models (structural constraints, schema/type systems, absence or presence of associated behavior, update semantics, etc.). Thus, a to draw on data from different sources, operate on synthesized data obtained from the different sources, react to updates to data from the different sources, and propagate change requests to the data at the different sources, applications must be able to compatibly interoperate with a variety of data types and data formats.

However, using various different data types and different data formats native to different applications can make the joining together of data from different applications, for example, into a data type and data format native to yet another application, difficult. This can result in inefficient processing of the data, and potentially incompatibility between applications.

BRIEF SUMMARY

The present invention extends to methods, systems, and computer program products for accessing and manipulating data in a data flow graph. In some embodiments data is provided to a client. A first data set, in a first data format and owned by a first data provider, is identified. A second data set, in a second different data format and owned by a second data provider, is identified. A first custom data connector, configured to receive data in the first data format and provide output data according to a specified protocol, is utilized to provide the first data set as first output data in accordance with the specified protocol. A second custom data connector, configured to receive data in the second data format and provide output data according to the specified protocol, is utilized to provide the second data set as second output data in accordance with the specified protocol. The first output data and the second output data are provided as input to a data flow graph. The data flow graph is configured to transform the data in accordance with a client request, from a client computer system, for access by the client computer system at a location in a metadata tree.

In other embodiments, data is updated at a client computer system. A request to register a client data dependency for a client is received. The data dependency indicates that data at one or more locations accessed by the client is dependent on data from at least two data providers that utilize different data formats. The client data dependency is registered to detect data changes in data at the at least two data providers. A change in a portion of data that at least one of the one or more locations depends on is detected. Revalidation of the data at the at least one location is triggered in response to detecting the change.

In further embodiments, data is changed at a data provider in response to a client requesting a change to the data. A client data change request is received from the client. The client data change request requests a change to observed data that is observed at a location accessible to the client. A data flow graph is traced back to a data provider that provided the external data the observed data is based on. The client data change request is translated into a provider data change request for changing the external data. The provider data change request is formulated in accordance with translations in the data flow graph. The provider data change request is sent to the data provider. The translated data change request is in a format that can be converted by the data provider into commands natively compatible with the data provider.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The present invention extends to methods, systems, and computer program products for accessing and manipulating data in a data flow graph. In some embodiments data is provided to a client. A first data set, in a first data format and owned by a first data provider, is identified. A second data set, in a second different data format and owned by a second data provider, is identified. A first custom data connector, configured to receive data in the first data format and provide output data according to a specified protocol, is utilized to provide the first data set as first output data in accordance with the specified protocol. A second custom data connector, configured to receive data in the second data format and provide output data according to the specified protocol, is utilized to provide the second data set as second output data in accordance with the specified protocol. The first output data and the second output data are provided as input to a data flow graph. The data flow graph is configured to transform the data in accordance with a client request, from a client computer system, for access by the client computer system at a location in a metadata tree.

In other embodiments, data is updated at client computer system. A request to register a client data dependency for a client is received. The data dependency indicates that data at one or more locations accessed by the client is dependent on data from at least two data providers that utilize different data formats. The client data dependency is registered to detect data changes in data at the at least two data providers. A change in a portion of data that at least one of the one or more locations depends on is detected. Revalidation of the data at the at least one location is triggered in response to detecting the change.

In further embodiments, data is changed at a data provider in response to a client requesting a change to the data. A client data change request is received from the client. The client data change request requesting a change to observed data that is observed at a location accessible to the client. A data flow graph is traced back to a data provider that provided the external data the observed data is based on. The client data change request is translating into a provider data change request for changing the external data. The provider data change request is formulated in accordance with translations in the data flow graph. The provider data change request is sent to the data provider. The translated data change request is in a format that can be converted by the data provider into commands natively compatible with the data provider.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. Computer-readable media may be categorized into two groups, computer-readable storage media and communication media. Computer-readable storage media includes RAM, ROM, EEPROM, CD-ROM or other optical disk storage, magnetic disk storage or other similar storage devices, Communication media includes carrier waves and signals. In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a communication medium. Thus, by way of example, and not limitation, communication media can comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1A:
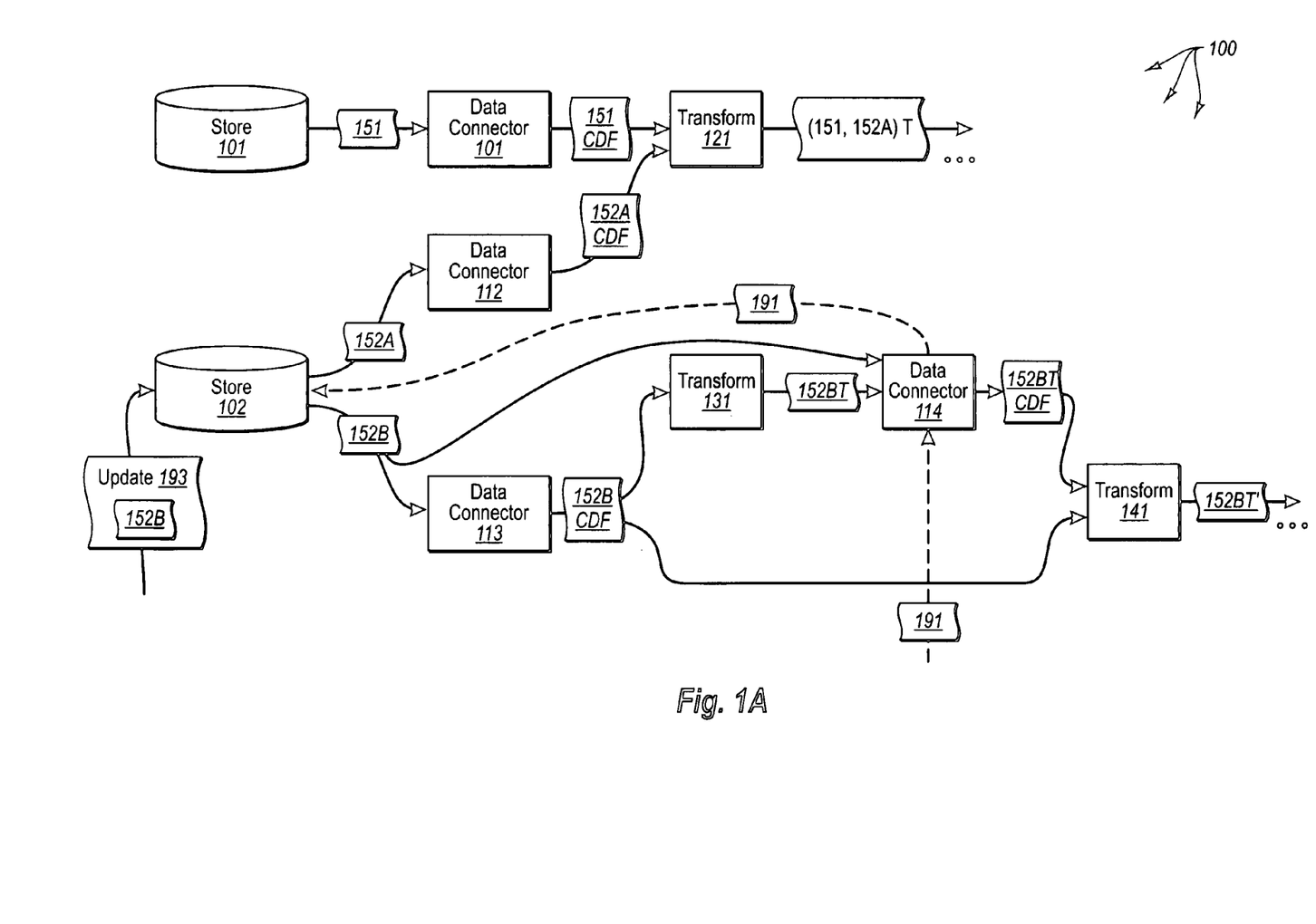
FIG. 1A illustrates an example computer architecture that facilitates transformation of data from one or more data stores into various data formats.

FIG. 1A illustrates an example of a computer architecture 100 that facilitates transformation of data from one or more data stores into various data formats. As depicted, computer architecture 100 includes stores 101 and 102. Stores 101 and 102 can each store data of various different data formats and data types. Data formats and data types used at store 101 and 102 can be completely different, at least partially the same, or can be completely the same.

In this description and in the following claims, a "data connector" is defined as a module that introduces data drawn from a store. For example, some data operations may be necessary to prepare data from store 101 and/or store 102 for introduction into computer architecture 100 for purposes of transforming the data. A data connector can perform these operations. In this description and in the following claims, the term "CDF" included in a data element refers to the term "connected data format" and indicates that the data element has been introduced and/or prepared by a data connector for input into a transform.

In this description and in the following claims, a "transform" is defined as a module that can transform data of a given data type and data format into a different data type and/or different data format. In this description and in the following claims, the character "T" included in a data element refers to the term "transformed" and indicates that the data element has been transformed by a transform module.

A transform can also split one or more data inputs into an increased number of transformed data outputs. For example, a transform can received a single data input and split the single data input data into two or more differently transformed outputs. A transform can also join a plurality of data inputs into a decreased number of transformed data outputs. For example, referring to FIG. 1A, transform 121 can receive 151 CDF and 152A CDF and join 151 CDF and 152A CDF into (151,152A)T.

In this description and in the following claims, the characters "A" and "B" included in a data element are used to differentiate different portions of data that originated form the same data store. For example, 152A and 152B are different portions of data that both originated from store 102.

Within architecture 100, store 101 can provide data 151 to data connector 111. Data connector 111 can perform any data operations to introduce the data 151 to transform 121. After any data operations are performed, data connector 111 outputs data 151 CDF.

Similarly, store 102 can provide data 152A to data connector 112. Data connector 112 can perform any data operations to introduce the data 152A to transform 121. After any data operations are performed, data connector 112 outputs data 152A CDF.

Transform 121 can receive 151 CDF and 152A CDF as inputs. Transform 121 can perform one or more data transformation operations, such as, for example, changing data types and changing data formats, on 151 CDF and/or 152A CDF to transformed versions of the data. Transform 121 can also join 151 CDF and 152A CDF into a (151,152A)T. Transform 121 can output (151,152A)T for use by other data connectors and/or transforms in architecture 100.

Likewise, store 102 can provide data 152B to data connector 113 and to data connector 114. Data connector 113 can perform any data operations to introduce the data 152B to transforms 131 and 141. After any data operations are performed, data connector 113 outputs data 152B CDF. Alternately, data connector 113 can output different portions of 152B for introduction to transform 131 and introduction to transform 141.

Transform 131 can receive 152B CDF as an input. Transform 131 can perform one or more data transformation operations, such as, for example, changing data types and change data formats, on 152B CDF to generate 152B T. Transform 131 can output 152B T to data connector 114.

Data connector 114 can receive 152B (from store 102) and 152B T (from transform 131) as input. Data connector 114 can perform any data operations to introduce data 152B and data 152B T to transform 141. After any data operations are performed, data connector 114 outputs data 152B T CDF (i.e., a transformed version of 152B and 152B T in a connected data format).

Transform 141 can receive 152B CDF and 152B T CDF as inputs. Transform 141 can perform one or more data transformation operations, such as, for example, changing data types and change data formats, on 152B CDF and/or 152B T CDF to generate transformed versions of the data. Transform 121 can also join portions of 152B CDF and/or 152B T CDF into 152 B T' (i.e., a further transform of data form 152B). Transform 141 can output 152 B T' for use by other data connectors and/or transforms in architecture 100.

In some embodiments, data connectors and transforms are symmetric such that inverse data operations are perform on data that flows in a reverse direction. For example, data connector 113 can receive 152B CDF as input, perform one or more inverse data operations on data 152B CDF, and output 152B for input to store 102.

A portion of data can also be split in a plurality of portions of data when data flows in the reverse direction. For example, transform 121 can perform one or more inverse data operations on (151, 152A)T to split (151, 152A)T into 151 CDF and 152A CDF. On the other, a plurality of portions of data can be joined in a reduced number of portions of data. For example, transform 131 and transform 141 can perform one or more inverse data operations on portions of 152B T and 152B T' respectively to join 152B T and 152B T' into 152B CDF.

Thus, through the use of inverse data operations, data updates received at a client can be propagated back to and implemented at the appropriate data store. For example, a client update to data 152B T can be propagated back to store 102. Similarly, a client update to data 151 CDF can be propagated back to store 101. Some client updates can cause corresponding updates to be implemented at a plurality of stores. For example, a client update to (151, 152A) T can result in updates being propagated back to both store 101 and store 102.

Use of architecture 100 facilitates data from stores 101 and 102 (and other data based on data from stores 101 and 102) being present in various different data formats and data types and in accessible from different locations as a result of data operations performed at data connectors and transforms. Access to the different locations where data may be present can be facilitated by a metadata tree.

Figure 1B:
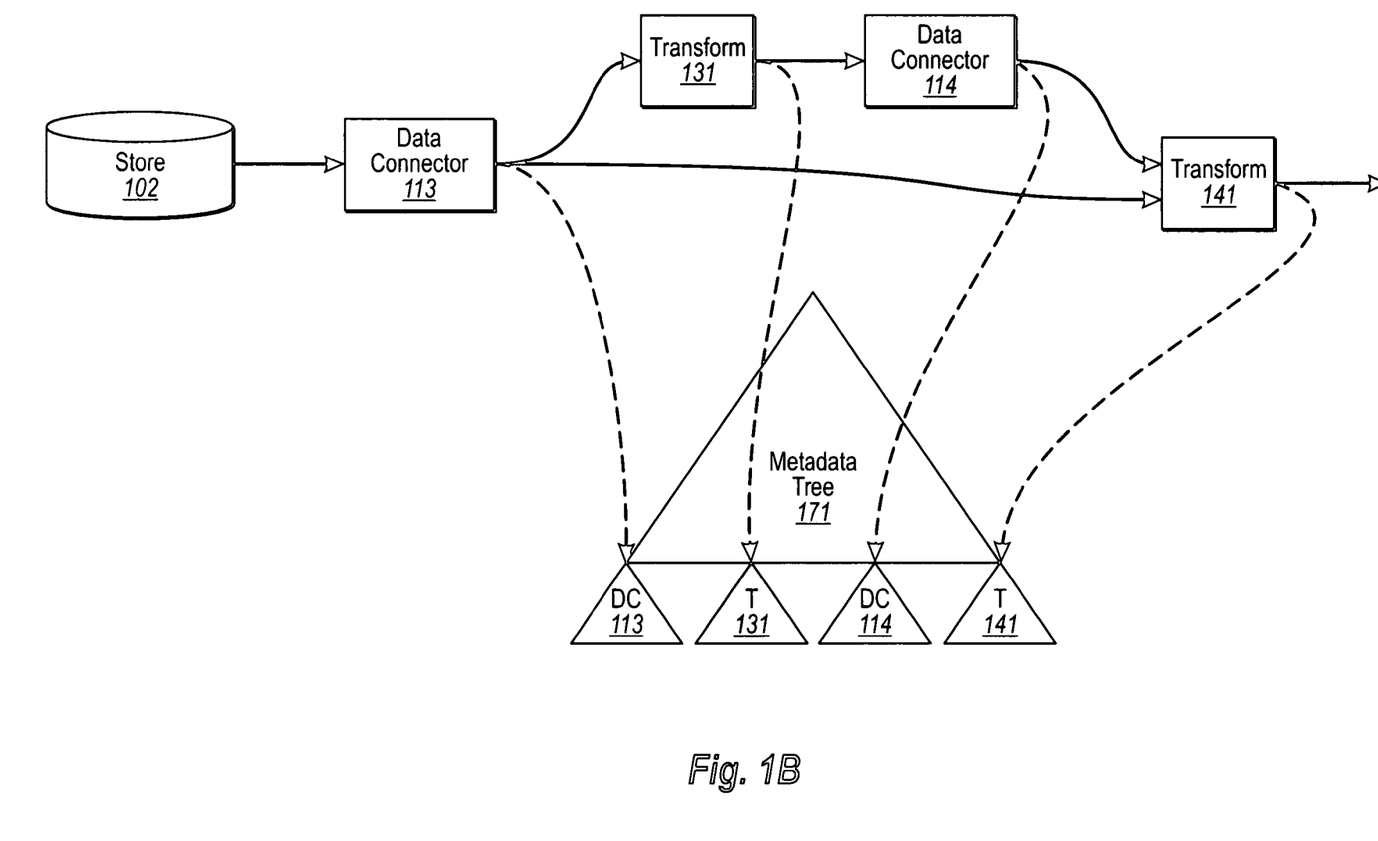
FIG. 1B illustrates a portion of FIG. 1A and a corresponding metadata tree that logically represents the locations of different data formats within the portion of FIG. 1A.

FIG. 1B illustrates a portion of architecture 100 and a corresponding metadata tree 171 that logically represents the locations of different data formats within architecture 100. Locations for accessing the output of data connectors and transforms can be logically included and arranged under metadata tree 171. For example, dashed lines 161, 162, 163, 164 indicate where the output of data connector 113, output from transform 131, output of data connector 114, and output of transform 141 respectively are logically located within metadata tree 171.

Metadata tree 171 can be accessed through a universal address space that supports declarative navigation across data connectors and transforms in architecture 100. Thus, locations within metadata tree 171 can be navigation paths that reference data declaratively. Accordingly, a reference to a path in metadata tree 171 can be used to access data from a specified location in architecture 100. For example, a reference to T 131 can be used to access data output from transform 131.

Location expressions can be based on a subset of a standard pathing language, such as, for example, XML Path Language ("XPath"). To facilitate incremental construction, relative locations can be supported.

Figure 1C:
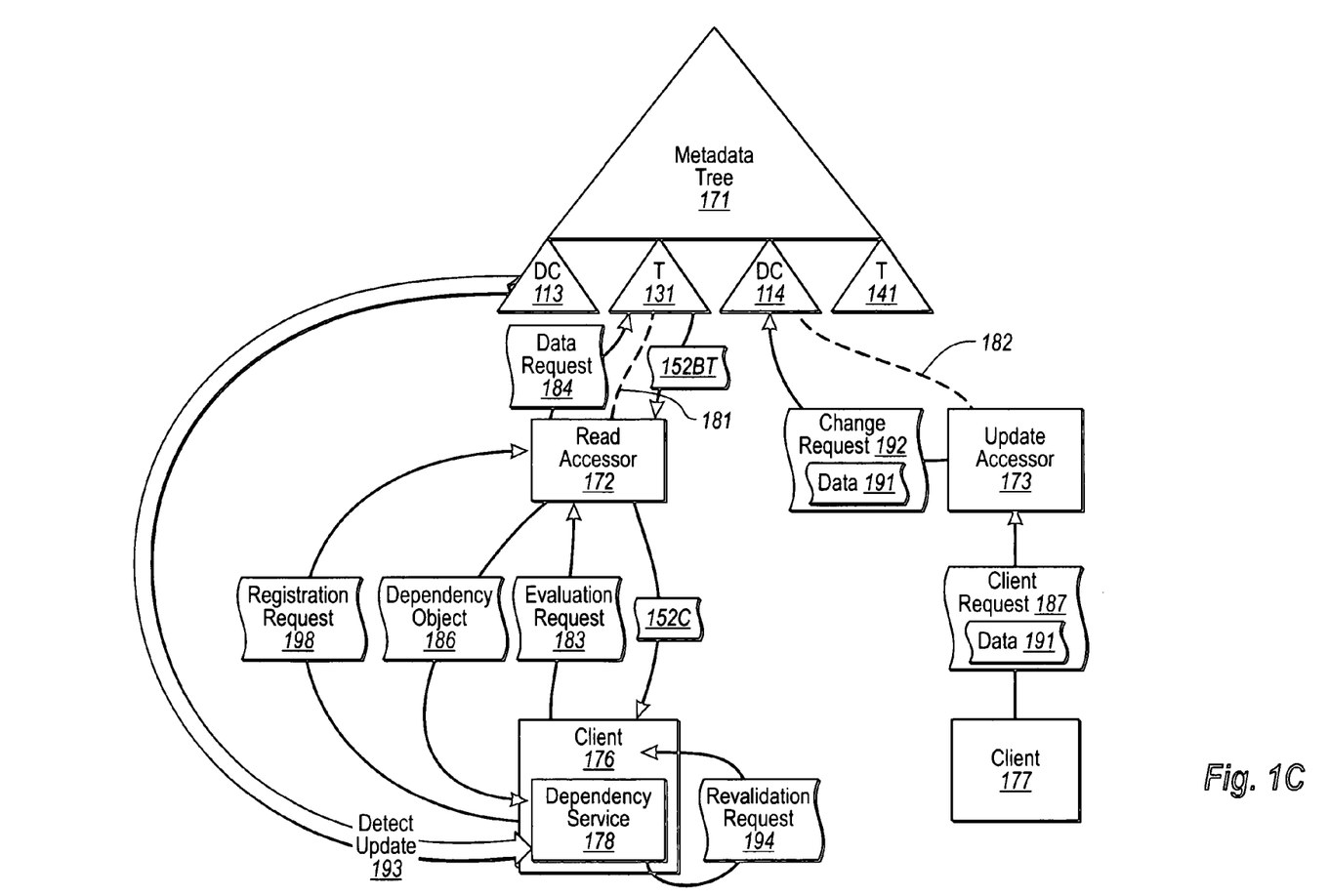
FIG. 1C illustrates the metadata tree from FIG. 1B relative to a number of clients that can interact with data at locations in the metadata tree.

FIG. 1C illustrates metadata tree 171 relative to a number of clients that can interact with data accessible through locations in metadata tree 171. To access data under a location, a client can specify an access model to use. Specifying an access model can be facilitated by requesting evaluation of data at the location to an accessor corresponding to the location. In this description and in the following claims, an "accessor" is a module that mediates between data clients and elements in a metadata tree. Accessor can be logically associated with specific elements in a metadata tree. For example, dashed lines 181 and 182 indicate that T 131 and DC 114 are logically associated with read accessor 172 and update accessor 173 respectively.

A read accessor can be used to pull data and present it in a specific form. For example, read accessor 172 can be used to pull data from T 131 (the output of transform 131) and present it in a form compatible with client 176. An update accessor can be used to update data by accepting requests against a specific form and mapping requests into change requests against underlying metadata tree elements. For example, update accessor 173 can receive an update request compatible with client 177 and convert that into a change request for DC 114 (the output of data connector 114).

When a client is dependent on data accessible from a metadata tree element, the client can request a dependency object (e.g., a token) from an accessor associated with the metadata tree element. A dependency service at the client can utilize the dependency object to become aware of update data at a metadata tree element. When an update is detected, the client can request revalidation of the data it depends on.

Figure 2:
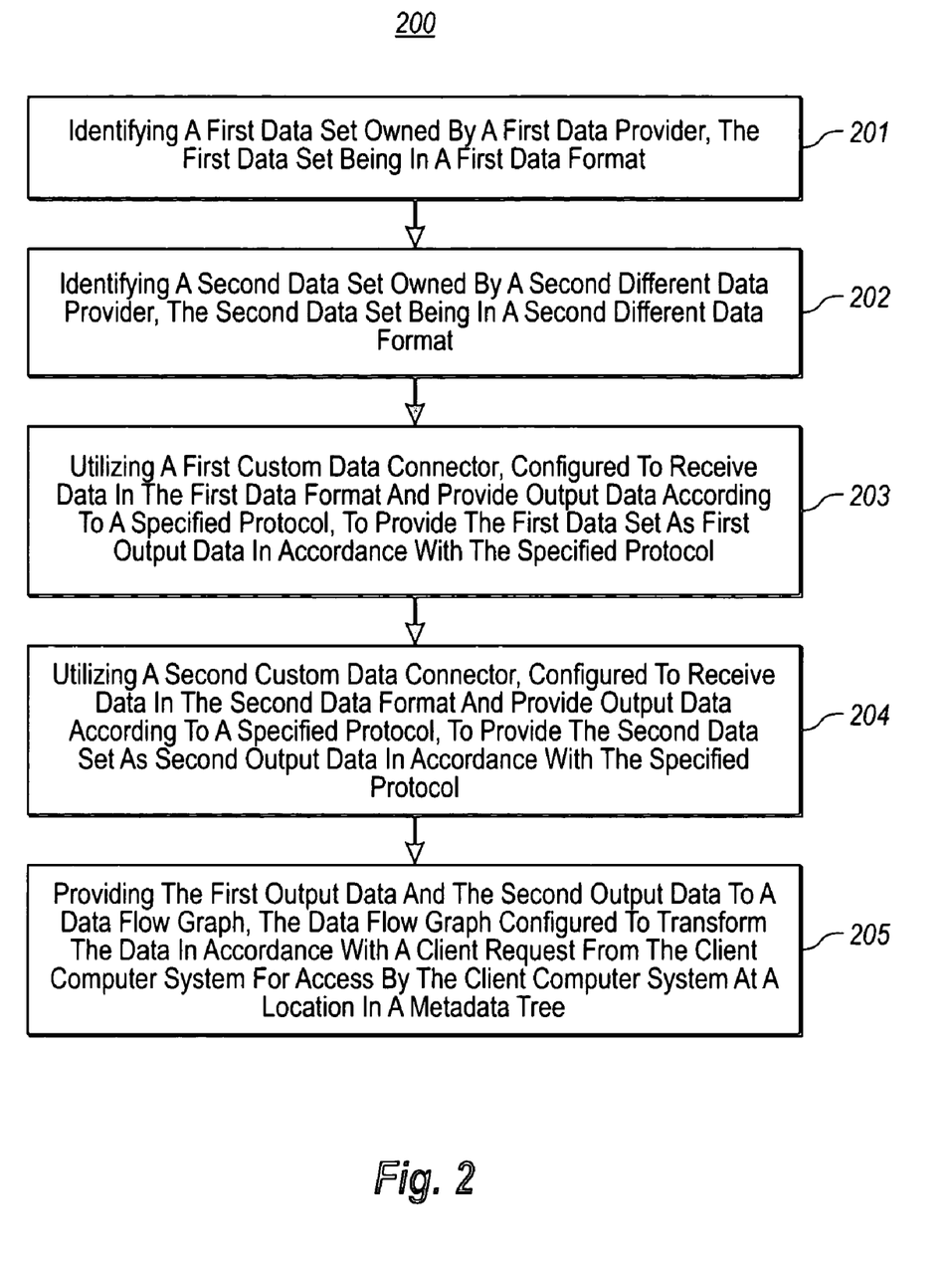
FIG. 2 illustrates an example flow chart of a method for providing data to a client.

FIG. 2 illustrates an example flow chart of a method 200 for providing data to a client. Method 200 will be described with respect to modules and data in FIGS. 1A, 1B, and 1C.

Method 200 includes an act of identifying a first data set owned by a first data provider, the first data set being in a first data format (act 201). For example, referring to FIG. 1A, data connector 111 can identify 151 from store 101. Method 200 includes an act of identifying a second data set owned by a second different data provider, the second data set being in a second different data format (act 202). For example, data connector 112 can identify 152A from store 102.

Method 200 includes an act of utilizing a first custom data connector, configured to receive data in the first data format and provide output data according to a specified protocol, to provide the first data set as first output data in accordance with the specified protocol (act 203). For example, data connector 111 can provide 151 CDF as output according to a protocol specified for input to transform 121. Method 200 includes an act of utilizing a second custom data connector, configured to receive data in the second data format and provide output data according to the specified protocol, to provide the second data set as second output data in accordance with the specified protocol (act 204). For example, data connector 112 can provide 152A CDF as output according to the protocol specified for input to transform 121.

Method 200 includes an act of providing the first output data and the second output data to a data flow graph (act 205). For example, 151 CDF and 152 CDF can be provided as input data to transform 121, which is part of a data flow graph represented in architecture 100. The data flow graph can be configured to transform the data in accordance with a client request from a client computer system for access by the client computer system at a location in a metadata tree. For example, architecture 100 is configured such that the output of transform 121 can be evaluated in accordance with a client request and made accessible to the client through an element in a metadata tree.

Data owned by a data provider can be data that is output from a module in a data flow graph. For example, 152B T CDF can be data that is owned by data connector 114. Similarly, 152B CDF can be data that is owned by data connector 113. 152B T CDF and 152B CDF can be output according to a protocol specified for input to transform 141. 152B T CDF and 152B CDF can be provided as input to transform 141. Transform 141 can transform 152B T CDF and 152B CDF in to 152BT'. Referring to FIG. 1B, 152BT' can be evaluated in accordance with a client request to T 141 and made accessible to a client through T 141.

In some embodiments, a client requests data through communication with a read accessor. For example, client 176 can send evaluation request 183 to read accessor 172. In turn, read accessor 172 can forward data request 184 to T 131 (the location for the output of transform 131). In response, to data request 184 architecture 100 can perform data operations to generate a value or values for 152B T (output of transform 131).

The value or values for 152B T can be returned to read accessor 172. When appropriate, read accessor can modify 152B T for compatibility with client 176. Read accessor 172 can return 152C to client 176. 152C can include the one or more values of 152B T in a format that is compatible with client 176. Read accessor 172 can include logic for generating an appropriate reference (e.g., XPath statement) for accessing T 131 based on data included in evaluation request 172.

Figure 3:
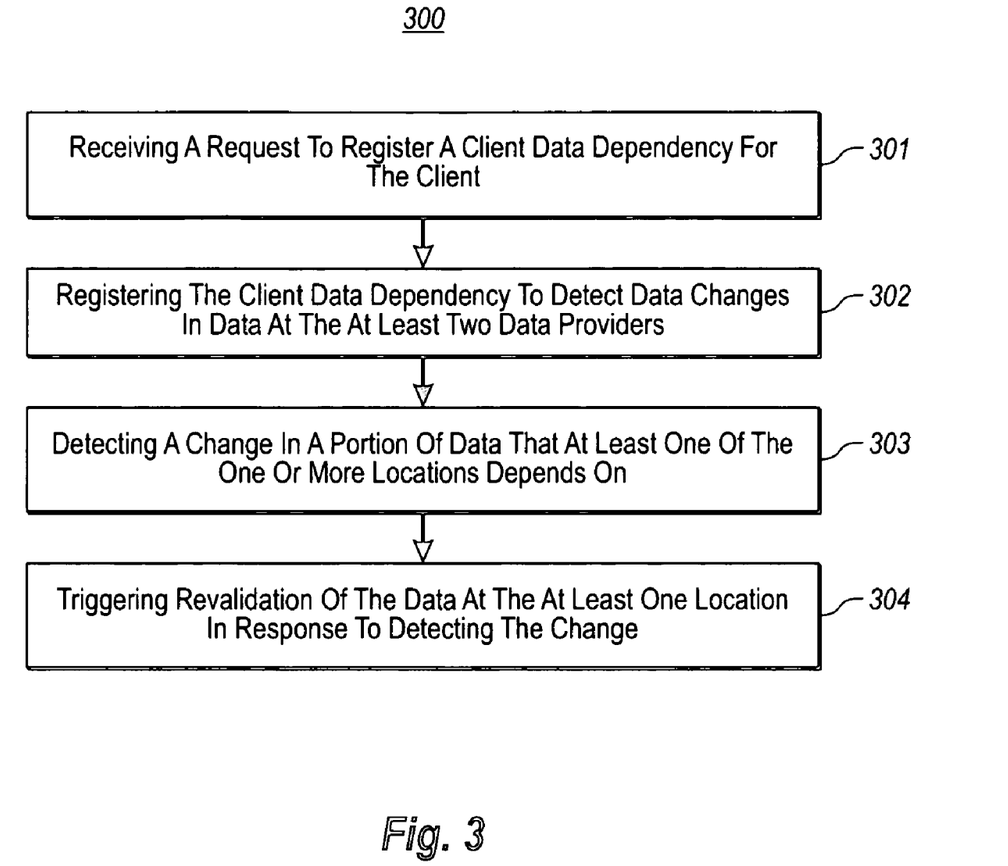
FIG. 3 illustrates an example flow chart of a method for providing data updates to a client.

FIG. 3 illustrates an example flow chart of a method for providing data updates to a client. Method 300 will be described with respect to modules and data in FIGS. 1A, 1B, and 1C.

Method 300 includes an act of receiving a request to register a client data dependency for the client (act 301). For example, referring to FIG. 3B, read accessor 172 can receive registration request 198 from client 176. Registration request 198 can be for registering a dependency on data accessed at T 131. The data dependency can indicate that data at one or more locations accessed by the client is dependent on data from a data provider. For example, a data dependency can indicate that data at T 131, accessed by client 176, is dependent on data from store 102.

In some embodiments, a data dependency can indicate that data accessed at a metadata tree element location is dependent on at least two data providers that utilize different data formats. For example, a data dependency on the output of transform 121 (e.g., T 121 in an appropriate metadata tree) can indicate that data at the corresponding metadata tree element location is dependent on data from store 101 and store 102.

Method 300 includes an act of registering the client data dependency to detect data changes in data at the at least two data providers (act 302). For example, read accessor 172 can register a data dependency for client 176 in response to registration request 198. Read accessor 172 can send dependency object 186 to client 176. Dependency service 178 can receive dependency object 186 and utilize dependency object 186 to receive notifications of updates to store 102.

Method 300 includes an act of detecting a change in a portion of data that at least one of the one or more locations depends on (act 303). For example, referring now to FIG. 1A, store 102 can receive update 193 including changes in to 152B. Referring back to FIG. 1C, dependency service 178 can detect update 193.

Method 300 includes an act of triggering revalidation of the data at the at least one location in response to detecting the change (act 304). For example, in response to detecting update 193, dependency service 178 can send revalidation request 194 to client 176. In response to revalidation request 194, client 176 can send an evaluation request (e.g., similar to evaluation request 183) to read accessor 172. Read accessor 172 can then (re)evaluate one or more values of 152B T (the output of transform 131). Read accessor 172 then send the one or more (re)evaluated values to client 176.

Figure 4:
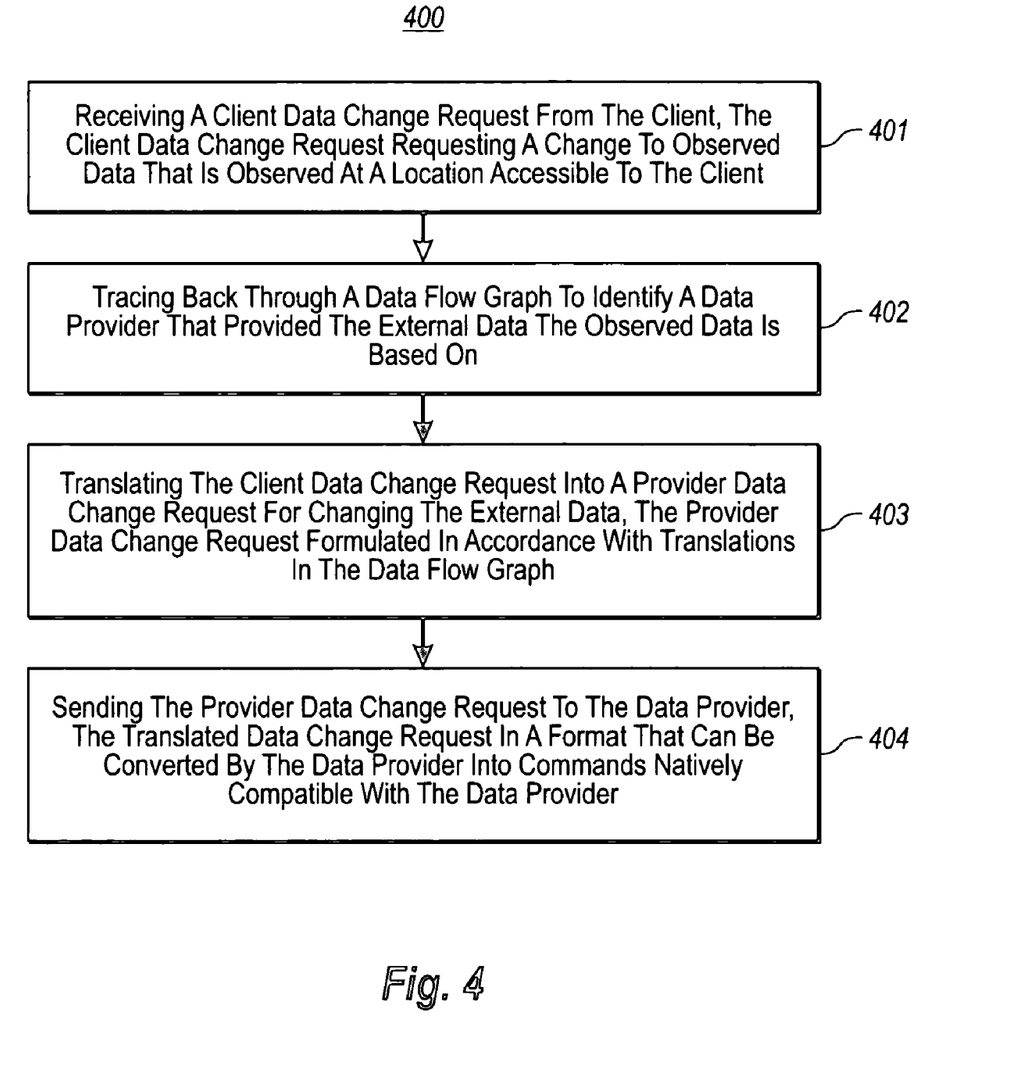
FIG. 4 illustrates an example flow chart of a method for changing data at a data store in response to a request to change the data from a client.

FIG. 4 illustrates an example flow chart of a method for changing data at a data store in response to a request to change the data from a client. Method 400 will be described with respect to modules and data in FIGS. 1A, 1B, and 1C.

Method 400 includes an act of receiving a client data change request from the client (act 401). For example, update accessor 173 can receive client request 187 from client 177. The client data change request requests a change to observed data that is observed at a location accessible to the client. For example, client request 187 can request a change to data 191C (e.g. data corresponding to one or more values in a portion of 152B T CDF).

Method 400 includes an act of tracing back through a data flow graph to identify a data provider that provided the external data the observed data is based on (act 402). For example, update accessor 102 can trace back through architecture 100 from data connector 114 to identify that store 102 provided data 152.

Method 400 includes an act of translating the client data change request into a provider data change request for changing the external data (act 403). For example, update accessor 173 can translate client request 187 into change request 192. The provider data change request can be formulated in accordance with translations in the data flow graph. For example, accessor 173 can configure change request 192 such that inverse data operations performed in architecture 100 compatible transform data 191 into a format compatible with store 102.

Method 400 includes an act of sending the provider data change request to the data provider (act 404). For example, update accessor 173 can send change request 192 to data connector 114. The translated data change request in a format that can be converted by the data provider into commands natively compatible with the data provider. Change request 192 can be in a format natively compatible with the inverse data operations of data connector 114.

Data connector 114 can perform one or more inverse data operations and propagate the change request to transform 131. Transform 131 can in turn perform one or more inverse data operations and propagate the change request to data connector 113. Data connector 113 can in turn perform one or more inverse data operations and propagate the change request to store 102. Accordingly, a client data change can be propagated and implemented in the appropriate store.

The present invention may be embodied in other specific forms without departing from its spirit or essential characteristics. The described embodiments are to be considered in all respects only as illustrative and not restrictive. The scope of to the invention is, therefore, indicated by the appended claims rather than by the foregoing description. All changes which come within the meaning and range of equivalency of the claims are to be embraced within their scope.

What is claimed is:

1. A method of using a computer architecture to transform data which is provided in different formats from different providers so that data provided in response to a request from a client computer system connected to a network is provided in an updated and compatible format for operation by the client computer system, wherein the computer architecture comprises first and second data stores for storing data having different formats that are otherwise not compatible, data connector modules for receiving data from each data store and for preparing the received data for input with a connected data format to a transform module, a transform module that transforms the input data into a different data type and/or different data format for compatible operation by the client computer system, and a metadata tree which provides a path for accessing storage locations which correspond to data as output by each data connector module and each transform module, and wherein the method is comprised of:

an act of inputting into a first data connector module a first data set from a first data store, the first data set being in a first data format;

an act of inputting into a second data connecter module a second data set from a second data store, the second data set being in a different data format that is otherwise incompatible for operation at the client computer system with the first data set;

an act of outputting the first data set from the first data connector module with a connected data format that is adapted for inputting the first data set into a first transform module;

an act of storing the first data set with a specified connected data format at a location in said metadata tree to permit access and retrieval of the first data set with its specified connected data format after the first data set is output from the first data connector module but before the first data set is input into the first transform module;

an act of outputting the second data set from the second data connector module with a specified connected data format that is adapted for inputting the second data set into a second transform module;

an act of storing the second data set with a specified connected data format at a location in said metadata tree to permit access and retrieval of the second data set with its specified connected data format after the second data set is output from the second data connector module but before the second data set is input into the second transform module;

an act of providing the first output data set to the first transform module and the second output data set to the second transform module, wherein the first and second transform modules transform the first and second data sets respectively in accordance with a client request from the client computer system so that the first and second data sets are then compatible for operation at the client computer system;

an act of storing the transformed first and second data sets at least one location in a metadata tree to permit access and retrieval of the transformed data sets for operation at the client system; and an act of receiving at an accessor module a request to register a client data dependency for the client computer system, the data dependency indicating that data at one or more locations in the metadata tree is dependent on data from at least two data stores that utilize different data formats, wherein the metadata tree stores various states of the data that are created as the data propagates through the data connector modules and transform modules of the computer architecture including the state of the data both before and after the data is input to the transform modules such that the metadata tree provides a path for accessing the various states of the data.

2. The method as recited in claim 1, wherein the first and second transform modules are the same transform module.

3. The method as recited in claim 1, wherein the first and second transform modules are different transform modules.

4. The method as recited in claim 1, wherein the method is further comprised of an act of requesting a dependency object in the form of a token from the accessor module which in turn is processed by a dependency service at the client computer system when updated data at the metadata tree requires revalidation at the client computer system.

5. The method as recited in claim 1, wherein the locations at which data is stored in the metadata tree are defined by location expressions based on a standard pathing language.

6. The method as recited in claim 1, wherein the at least one or more of the data connector and transform modules are symmetric such that inverse data operations may be performed as desired on data that flows in a reverse direction.

7. A method of using a computer architecture to transform and provide updated data which is provided in different formats from different providers so that data provided in response to a request from a client computer system connected to a network is provided in an updated and compatible format for operation by the client computer system, wherein the computer architecture comprises first and second data stores for storing data having different formats that are otherwise not compatible, data connector modules for receiving data from each data store and for preparing the received data for input with a connected data format to a transform module, a transform module that transforms the input data into a different data type and/or different data format for compatible operation by the client computer system, a metadata tree which provides a path for accessing storage locations which correspond to data as output by each data connector module and each transform module, and an accessor module for interacting between client computer systems and the metadata tree to locate and access data stored in the metadata tree by either retrieving or updating data stored in the metadata tree in response to requests from one or more client computer systems, and wherein the method is comprised of:

an act of receiving at an accessor module a request to register a client data dependency for the client computer system, the data dependency indicating that data at one or more locations in the metadata tree is dependent on data from at least two data stores that utilize different data formats, wherein the metadata tree stores various states of the data that are created as the data propagates through the data connector module and transform module of the computer architecture including the state of the data both before and after the data is input to the transform module such that the metadata tree provides a path for accessing the various states of the data;

an act of registering at the accessor module the client data dependency so that changes in data from either of the data stores which is stored in the metadata tree can be detected by the client computer system;

an act of detecting at the client computer system a change in data of at least one of the data stores that is stored at a location in the metadata tree; and in response to the change in data detected at the client computer system, an act of triggering revalidation of the changed data at the at least one location of the metadata tree.

8. The method as recited in claim 7, further comprising an act of sending a dependency object from the accessor module to the client computer system in response to receiving the registration request from the client computer system.

9. The method as recited in claim 8, wherein the act of registering at the accessor module the client data dependency comprises an act of the client computer system forwarding a dependency object received from the accessor module to a dependency service located at the client computer system.

10. The method as recited in claim 7, wherein the act of receiving at an accessor module a request to register a client data dependency for the client computer system comprises an act of receiving a registration request that requests dependency on a portion of data at least partially accessed from a first data store and at least partially accessed from second a different data store.

11. The method as recited in claim 7, wherein the act of receiving at an accessor module a request to register a client data dependency for the client computer system comprises an act of receiving a registration request that requests dependency on a portion of data that is transformed by one or more transform modules before being accessed by client computer system, the one or more transforms transforming the portion of data into a format that is compatible for operation by the client computer system.

12. The method as recited in claim 7, further comprising:
an act of sending from the client computer system to the accessor module an evaluation request to receive values for data at at least one or more locations for data stored in the metadata tree in response to the revalidation trigger.

13. A method of using a computer architecture to transform data which is provided in different formats from different providers so that data provided in response to a request from a client computer system connected to a network is provided in an updated and compatible format for operation by the client computer system, and then appropriately changing data at a data provider in response to a data changed by the client computer system, wherein the computer architecture comprises first and second data stores for storing data having different formats that are otherwise not compatible, data connector modules for receiving data from each data store and for preparing the received data for input with a connected data format to a transform module, a transform module that transforms the input data into a different data type and/or different data format for compatible operation by the client computer system, a metadata tree which provides a path for accessing storage locations which correspond to data as output by each data connector module and each transform module, and an accessor module for interacting between client computer systems and the metadata tree to locate and access data stored in the metadata tree by either retrieving or updating data stored in the metadata tree in response to requests from one or more client computer systems, and wherein the method is comprised of:

an act of inputting into a first data connector module a first data set from a first data store, the first data set being in a first data format;

an act of inputting into a second data connecter module a second data set from a second data store, the second data set being in a different data format that is otherwise incompatible for operation at the client computer system with the first data set;

an act of outputting the first data set from the first data connector module with a connected data format that is adapted for inputting the first data set into a first transform module;

an act of storing the first data set with a specified connected data format at a location in said metadata tree to permit access and retrieval of the first data set with its specified connected data format after the first data set is output from the first data connector module but before the first data set is input into the first transform module;

an act of outputting the second data set from the second data connector module with a specified connected data format that is adapted for inputting the second data set into a second transform module;

an act of storing the second data set with a specified connected data format at a location in said metadata tree to permit access and retrieval of the second data set with its specified connected data format after the second data set is output from the second data connector module but before the second data set is input into the second transform module;

an act of providing the first output data set to the first transform module and the second output data set to the second transform module, wherein the first and second transform modules transform the first and second data sets respectively in accordance with a client request from the client computer system so that the first and second data sets are then compatible for operation at the client computer system;

an act of storing the transformed first and second data sets at at least one location in said metadata tree to permit access and retrieval of the transformed data sets for operation at the client system, wherein the metadata tree stores various states of the data that are created as the data propagates through the data connector modules and transform modules of the computer architecture including the state of the data both before and after the data is input to the transform modules such that the metadata tree provides a path for accessing the various states of the data;

an act of receiving at an accessor module a client data change request from the client computer system, the client data change request requesting a change to data that is accessed in the metadata tree accessible to the client;

an act of tracing back through the metadata tree to identify a data store of a provider that provided the data that is the subject of the change request;

an act of translating the client data change request into a provider data change request formulated in accordance with translations derived by tracing the data that is the subject of the change request back through the locations in the metadata tree where the corresponding data was stored as outputs to either a data connector module and/or a transform module; and an act of sending the provider data change request to the data store of the provider of the data in a format that can be converted by the data provider into commands natively compatible with the data store of the provider.

14. The method as recited in claim 13, wherein the act of receiving at an accessor module a client data change request from the client computer system comprises an act of a write accessor receiving a client change request, the write accessor configured to interact with one or more portions of the metadata tree that logically represents corresponding portions of a data flow graph.

15. The method as recited in claim 13, wherein the act of receiving at an accessor module a client data change request from the client computer system comprises an act of receiving a client data change request for data originating from at least two different data stores.

16. The method as recited in claim 15, wherein the act of translating the client data change request into a provider data change request comprises an act of splitting the client data change request into multiple provider data change requests, each provider data change request compatible with changing data at a corresponding data store.

17. The method as recited in claim 14, wherein the write accessor interacts with one or more portions of the metadata tree by using an electronic pathing language to address a portion of a metadata tree that is to receive the provider data change request.

18. The method as recited in claim 13, wherein the act of sending the provider data change request to the data store of the provider of the data comprises an act of performing one or more inverse data operations at one or more data connection modules and/or transform modules to convert data from a client data format to a data store data format.

19. A computer program product comprising a computer-readable storage media which contains computer-executable instructions for implementing the method of claim 1.

20. A computer program product comprising a computer-readable storage media which contains computer-executable instructions for implementing the method of claim 7.

21. A computer program product comprising a computer-readable storage media which contains computer-executable instructions for implementing the method of claim 13.

* * * * *